US010369882B2

(12) United States Patent
Mihara

(10) Patent No.: US 10,369,882 B2
(45) Date of Patent: Aug. 6, 2019

(54) VALVE CASE MOUNTING STRUCTURE

(71) Applicant: PIOLAX, INC., Yokohama-shi (JP)

(72) Inventor: Kenta Mihara, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 14 days.

(21) Appl. No.: 15/506,312

(22) PCT Filed: Aug. 21, 2015

(86) PCT No.: PCT/JP2015/073581
§ 371 (c)(1),
(2) Date: Feb. 24, 2017

(87) PCT Pub. No.: WO2016/031726
PCT Pub. Date: Mar. 3, 2016

(65) Prior Publication Data
US 2017/0274760 A1 Sep. 28, 2017

(30) Foreign Application Priority Data

Aug. 25, 2014 (JP) .................................. 2014-170673

(51) Int. Cl.
B60K 15/03 (2006.01)
F02M 37/00 (2006.01)
(Continued)

(52) U.S. Cl.
CPC ...... B60K 15/03519 (2013.01); B60K 15/035 (2013.01); F02M 37/0023 (2013.01);
(Continued)

(58) Field of Classification Search
CPC ......... B60K 15/03519; F02M 37/0023; F02M 37/103; F16K 24/044; F16K 27/02
(Continued)

(56) References Cited

U.S. PATENT DOCUMENTS 316,872 A * 4/1885 Bretzfield ............ A44B 11/006
24/164
370,757 A * 10/1887 Banks ...................... B68B 3/22
54/54
(Continued)

FOREIGN PATENT DOCUMENTS

CN 102656041 A 9/2012
CN 103917812 A 7/2014
(Continued)

OTHER PUBLICATIONS

International Search Report (ISR) (PCT Form PCT/ISA/210), in PCT/JP2015/073581, dated Oct. 13, 2015.
(Continued)

Primary Examiner — Timothy L Maust
Assistant Examiner — James R Hakomaki
(74) Attorney, Agent, or Firm — McGinn I.P. Law Group, PLLC.

(57) ABSTRACT

A valve case mounting structure includes a mount base and a valve case. The mount base includes a valve case support portion and a retainer piece having a first engagement opening and a second engagement opening. The valve case includes an engaging projection portion, and a holder portion. When the engaging projection portion is positioned at a front end side of the first engagement opening, the retainer piece does not reach the holder portion. When the engaging projection portion is moved from the front end side of the first engagement opening toward the second engagement opening, a front end portion of the retainer piece is inserted into the holding space before becoming unable to be inserted into the holder portion.

10 Claims, 7 Drawing Sheets

(51) Int. Cl.
*F02M 37/10* (2006.01)
*F16K 24/04* (2006.01)
*F16K 27/02* (2006.01)
*B60K 15/035* (2006.01)

(52) U.S. Cl.
CPC ......... *F02M 37/103* (2013.01); *F16K 24/044* (2013.01); *F16K 27/02* (2013.01); *B60K 2015/03289* (2013.01); *B60K 2015/03467* (2013.01)

(58) Field of Classification Search
USPC ....................................................... 141/303
See application file for complete search history.

(56) References Cited

U.S. PATENT DOCUMENTS

| | | | | |
|---|---|---|---|---|
| 744,564 | A * | 11/1903 | Kisling | A44C 5/0092 24/16 PB |
| 2,341,608 | A * | 2/1944 | Gey | A01K 35/00 24/16 PB |
| 6,286,539 | B1 | 9/2001 | Nishi et al. | |
| 6,634,341 | B2 * | 10/2003 | Crary | B60K 15/035 123/516 |
| 6,840,262 | B2 * | 1/2005 | Kojima | F16K 17/19 137/202 |
| 6,863,082 | B1 * | 3/2005 | McIntosh | B60K 15/03519 137/202 |
| 6,966,330 | B2 * | 11/2005 | Frohwein | F16K 24/04 137/202 |
| 7,147,017 | B2 * | 12/2006 | Leonhardt | F16K 24/044 141/198 |
| 8,091,578 | B2 * | 1/2012 | Roth | F16K 1/02 137/202 |
| 2005/0022898 | A1 * | 2/2005 | Williamson | B60K 15/03519 141/302 |
| 2005/0034759 | A1 | 2/2005 | McIntosh et al. | |
| 2005/0087227 | A1 * | 4/2005 | Powell | F16K 24/044 137/202 |
| 2009/0084449 | A1 * | 4/2009 | Matsuo | F16K 24/044 137/409 |
| 2010/0089466 | A1 * | 4/2010 | Kobayashi | B60K 15/03519 137/409 |
| 2012/0318794 | A1 * | 12/2012 | Patil | B60K 15/03519 220/203.2 |
| 2014/0305514 | A1 | 10/2014 | Mihara | |
| 2015/0034174 | A1 * | 2/2015 | Sui | F16K 24/044 137/202 |
| 2015/0122347 | A1 * | 5/2015 | Marlow | B60K 15/035 137/202 |
| 2015/0252760 | A1 * | 9/2015 | Mihara | F02M 37/20 137/202 |
| 2016/0201817 | A1 * | 7/2016 | Koukan | F16K 24/04 137/15.08 |
| 2016/0243932 | A1 | 8/2016 | Sui | |

FOREIGN PATENT DOCUMENTS

| | | |
|---|---|---|
| JP | H08-184388 A | 7/1996 |
| JP | 2000-266208 A | 9/2000 |
| JP | 3506034 B2 | 3/2004 |
| JP | 2006138256 A * | 6/2006 |
| JP | 2008001253 A * | 1/2008 |
| JP | 2013-103562 A | 5/2013 |

OTHER PUBLICATIONS

Chinese Office Action dated Sep. 13, 2018, in corresponding Chinese Patent Application No. 201580045635.6, with an English translation thereof.

* cited by examiner

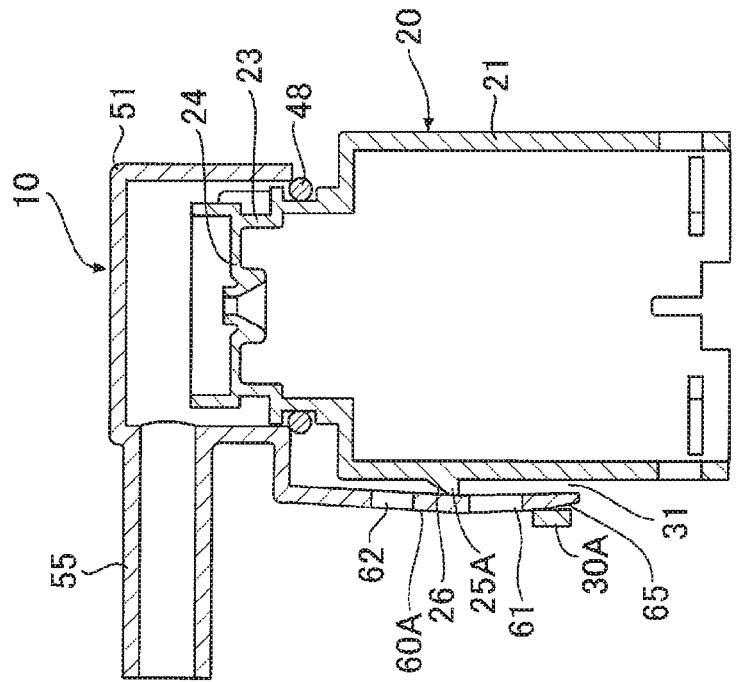
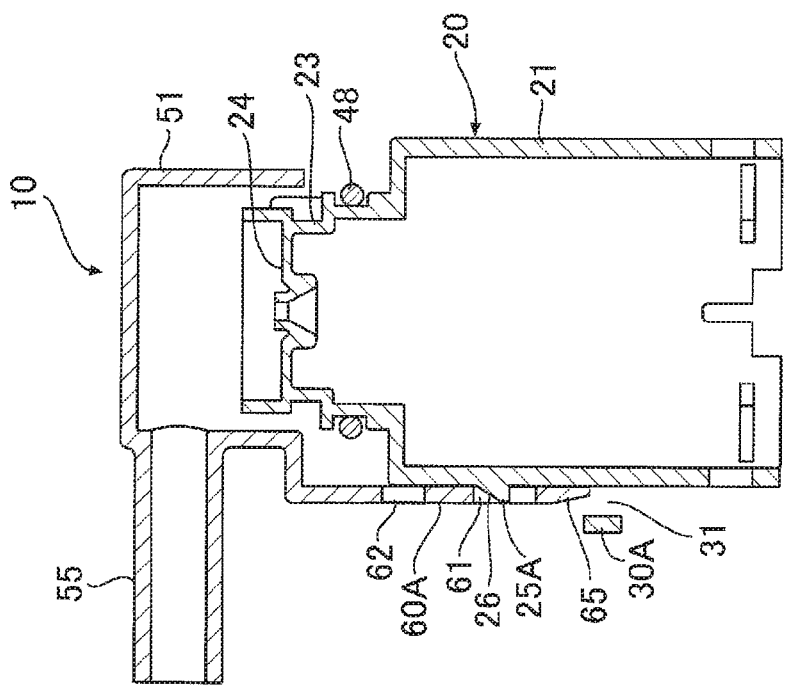

VALVE CASE MOUNTING STRUCTURE

TECHNICAL FIELD

The present invention relates to a valve case mounting structure for mounting a valve case for use in a float valve device or the like on a mounting base fixed to a fuel tank.

BACKGROUND ART

For example, a cut valve, an excess-feeding regulation valve, and the like are mounted on a fuel tank of a motor vehicle, the cut valve preventing fuel in the fuel tank from leaking out of the fuel tank when the vehicle sharply turns or is inclined, the excess-feeding regulation valve preventing the fuel tank from being fed with excessive fuel to keep the fuel level in the fuel tank not to rise over a full fuel level that is set in advance.

The valve as described above is mounted on the fuel tank by welding a lid body to be mounted on an upper portion of a valve main body of the valve to an opening circumferential edge of the fuel tank, or mounted on the fuel tank via a bracket that is integral with or separate from the fuel tank.

As an example of the valve having the structure of mechanically mounting the valve main body on the lid body via an engagement pawl, an engagement hole, or the like, Patent Document 1 describes a fuel cutoff valve that includes a lid body partially inserted into a mounting hole provided on a tank upper wall of a fuel tank to be welded to the tank upper wall, a case main body mounted on the lid body, and a float disposed inside the case main body in a vertically movable manner.

The lid body includes a lid main body having the shape of being closed at its upper portion and opened at its lower portion, a flange portion protruding in the radial outer direction from a lower circumferential edge of the lid main body, and a fitting portion protruding from a lower portion of the lid main body into a tongue shape via a plurality of slits, the fitting portion including an engagement hole. Meanwhile, on an upper portion of the case main body, an engagement protrusion is engaged with the engagement hole, and a holding portion having the shape of the inverted letter L is disposed on an outer periphery at a position lower than the engagement protrusion and arranged to regulate expansion of the lower edge portion of the fitting portion.

Inserting the distal end portion of the tongue-shaped fitting portion of the lid body into an opening portion above the holding portion of the case main body to push in the lid body toward the case main body makes the engagement protrusion of the case main body get inside the fitting portion to move therein while pressing outward the fitting portion of which expansion is regulated by the holding portion. Then, reaching the engagement hole of the fitting portion, the engagement protrusion is engaged with the engagement hole, whereby the case main body is mounted on the lid body.

CITATION LIST

Patent Literature

Patent Document 1

SUMMARY OF THE INVENTION

Problem that the Invention is to Solve

The fuel cutoff valve described in Patent Document 1 has an advantage that the engagement protrusion is less likely to fall off the engagement hole provided to the holding fitting portion because the expansion of the fitting portion is regulated by the holding portion when the lid is mounted on the case main body.

However, regarding mounting workability of the case main body on the lid body, when mounting the case main body on the lid body, the lid body is pushed in while the distal end portion of the fitting portion gets over the engagement protrusion to expand, so that the distal end portion of the fitting portion sometimes bumps into an edge portion of the opening portion above the holding portion and is thus made unable to push in any more.

An object of the present invention is to provide a valve case mounting structure capable of improving mounting workability of a valve case on a mounting base, and preventing the valve case from falling off the mounting base after mounting.

Means for Solving the Problem

To achieve the above-described object, the present invention provides a valve case mounting structure installed in a fuel tank, the valve case mounting structure including:

a mounting base fixed to the fuel tank; and a valve case mounted on the mounting base and accommodating a valve element thereinside, wherein the mounting base includes a valve case supporting portion arranged to support an upper portion of the valve case, and a retaining piece extending downward from a peripheral portion of the valve case supporting portion and arranged to retain the valve case, wherein the retaining piece includes a first engagement hole disposed on its distal end side, and a second engagement hole disposed closer to its base end side than the first engagement hole, the first engagement hole and the second engagement hole being separated from each other by a predetermined distance, wherein a peripheral wall of the valve case includes an engagement convex portion arranged to be inserted sequentially into the first engagement hole and the second engagement hole in the course of causing the upper portion of the valve case to be supported by the valve case supporting portion, and a holding portion including a holding space arranged to receive a distal end of the retaining piece to regulate an expansion thereof, and wherein, when the engagement convex portion is positioned on a distal end side of the first engagement hole, the retaining piece does not reach the holding portion, and wherein, when the engagement convex portion moves from the distal end side of the first engagement hole to the second engagement hole, the retaining piece is expanded by being pressed from inside by the engagement convex portion, but the distal end of the retaining piece is inserted into the holding space of the holding portion before the retaining piece becomes uninsertable into the holding space of the holding portion.

There may be provided the valve case mounting structure, wherein the distal end of the retaining piece is inserted into the holding space of the holding portion when the engagement convex portion is positioned on a base end side of the first engagement hole.

There may be provided
the valve case mounting structure,
wherein the first engagement hole is positioned inside the holding space of the holding portion when the engagement convex portion is inserted into the second engagement hole to be engaged therewith and the upper portion of the valve case is supported by the valve case supporting portion.

There may be provided
the valve case mounting structure,
wherein the retaining piece includes a tapered surface on an outer side of the distal end of the retaining piece so as to become gradually thinner toward the distal end of the retaining piece, and
wherein the tapered surface abuts on an opening circumferential edge of the holding space of the holding portion when the engagement convex portion is abuttingly passing by a wall portion between the first engagement hole and the second engagement hole.

Advantageous Effects of Invention

With the present invention, the retaining piece extending from the mounting base is aligned to be matched with the engagement convex portion and the holding portion of the valve case, and while maintaining this state, the upper portion of the valve case is inserted into a valve case supporting portion of the mounting base, and the distal end of the retaining piece abuts on the engagement convex portion to move while expanding outward. Thus, the engagement convex portion gets in the first engagement hole. In a state where the engagement convex portion is disposed on the distal end side of the first engagement hole, the retaining piece is out of reach of the holding portion, and flexibly returns inward so as to get close to a peripheral wall of the valve case.

When the valve case is inserted into the valve case supporting portion of the mounting base in this state, the engagement convex portion moves from the distal end side of the first engagement hole toward the base end of the first engagement hole to get out of the first engagement hole to abut on the inner side of the retaining piece, and proceeds while expanding the retaining piece outward to get in the second engagement hole. The distal end portion of the retaining piece is arranged to, before the retaining piece expanded by being pressed from the inside by the engagement convex portion to become uninsertable into the holding space of the holding portion, be inserted into the holding space. Thus, the distal end portion of the retaining piece can be prevented from bumping into the holding portion to be made unable to push in, which can achieve an improvement in mounting workability of the valve case.

In addition, when the engagement convex portion gets in the second engagement hole, the retaining piece is inserted into to be held in the holding space of the holding portion. As a result, the engagement convex portion of the valve case is engaged with to be retained in the second engagement hole of the retaining piece while the retaining piece is held and regulated not to expand by the holding portion. Thus, the valve case can be securely mounted on the mounting base.

BRIEF DESCRIPTION OF DRAWINGS

FIG. 4A is a cross-sectional explanatory view of the first step thereof. FIG. 4B is a cross-sectional explanatory view of the second step thereof.

FIGS. 5A and 5B are views of the structure showing the state where the valve case is mounted on the mounting base. FIG. 5A is a cross-sectional explanatory view of the third step thereof. FIG. 5B is a cross-sectional explanatory view of the fourth step thereof.

MODE FOR CARRYING OUT THE INVENTION

Hereinafter, a valve case mounting structure according to one embodiment of the present invention will be described referring to FIGS. 1 to 6.

Figure 1:
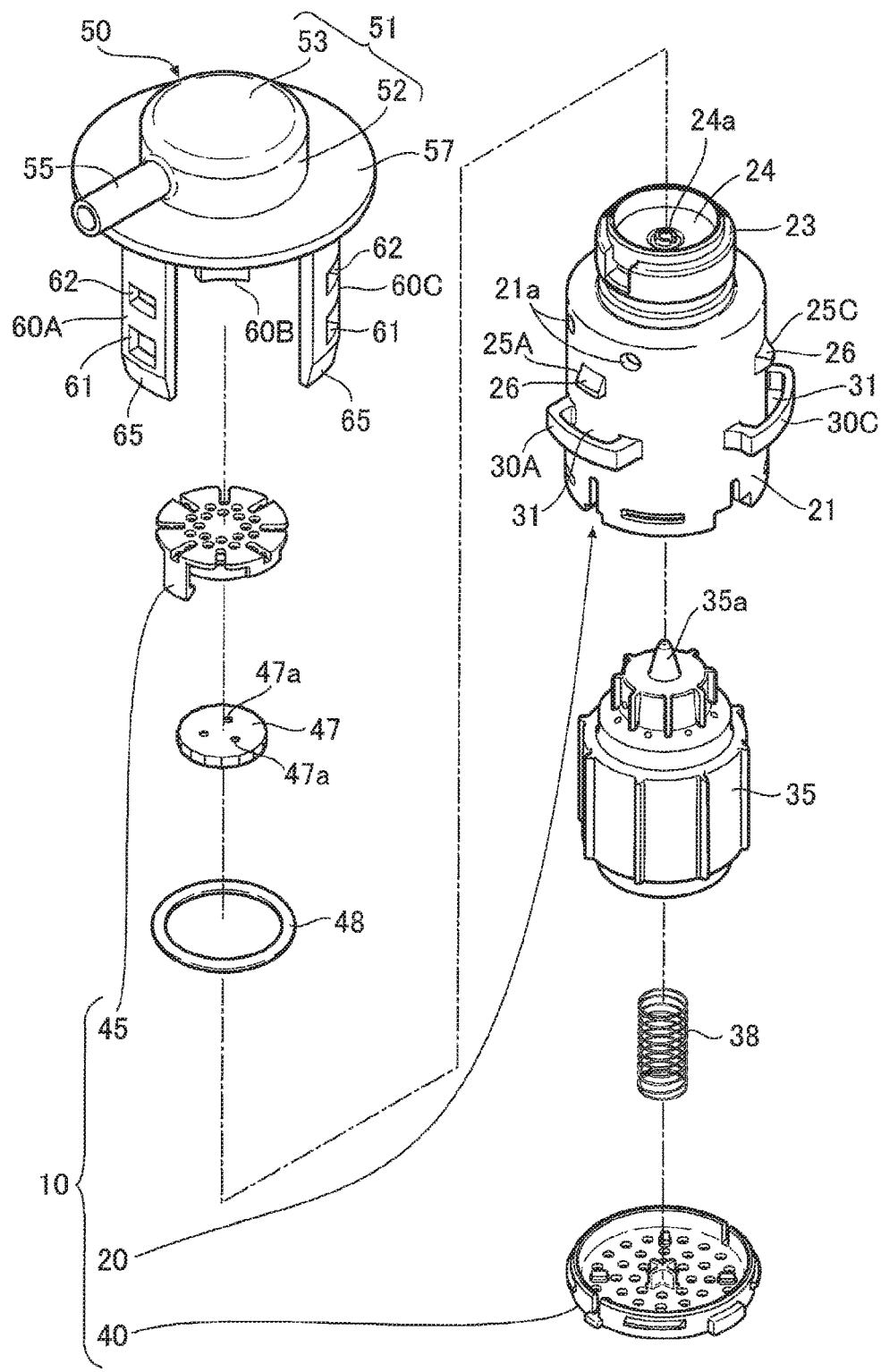
FIG. 1 is an exploded perspective view of a valve case mounting structure according to one embodiment of the present invention.

As shown in FIG. 1, the valve case mounting structure includes a mounting base 50 including a valve case supporting portion 51 and a plurality of retaining pieces 60A, 60B, and 60C and fixed to a fuel tank (not illustrated), and a valve case 10 mounted on the mounting base 50 and including a valve element inside.

Firstly, the valve case 10 will be described.

The valve case 10 according to the present embodiment includes a case main body 20 having an approximately circular cylindrical shape that houses a float valve element 35 in its lower portion in a vertically movable manner, and houses a plate valve element 47 in its upper portion in a vertically movable manner, a lower cap 40 mounted on the lower opening portion of the case main body 20, and an upper cap 45 mounted on the upper opening portion of the case main body 20.

The case main body 20 includes a peripheral wall 21 having an approximately cylindrical shape, and an upper cylinder portion 23 having an approximately circular cylindrical shape that is disposed above the peripheral wall 21 and is smaller in diameter than the peripheral wall 21. The peripheral wall 21 includes communicating holes 21a in its upper portion that communicate with the space in the inner periphery of the peripheral wall 21. The upper cylinder portion 23 defines a portion that is inserted into the valve case supporting portion 51 of the mounting base 50 to be described later (see FIG. 3). That is, the upper cylinder portion 23 defines the "upper portion of the valve case" of the present invention. The upper cylinder portion 23 includes a partition wall 24 inside in its upper portion that has an opening 24a in its center. A seal ring 48 that closely abuts on the inner periphery of the valve case supporting portion 51 to seal the gap between the valve case supporting portion 51 and the upper cylinder portion 23 is mounted on the outer periphery of the upper cylinder portion 23 (see FIG. 3).

The float valve element 35 including a valve head 35a in the center of its upper portion is housed in a vertically movable manner inside the inner periphery of the peripheral wall 21 below the partition wall 24. The lower cap 40 is mounted on the lower opening portion of the case main body 20, and a valve urging spring 38 is interposed between the lower cap 40 and the float valve element 35.

The float valve element 35 is arranged to, in a normal state, compress the valve urging spring 38 by its own weight to be placed on the lower cap 40 to bring the opening 24a of the partition wall 24 (see FIG. 3) into an opened state while the float valve element 35 is arranged to. And, in a state of being immersed in fuel at the time when the fuel level inside the fuel tank rises, ascend by the buoyant forces of the valve urging spring 38 and the float valve element 35 itself, whereby the opening 24a is closed by the valve head 35a (see FIG. 6).

Figure 3:
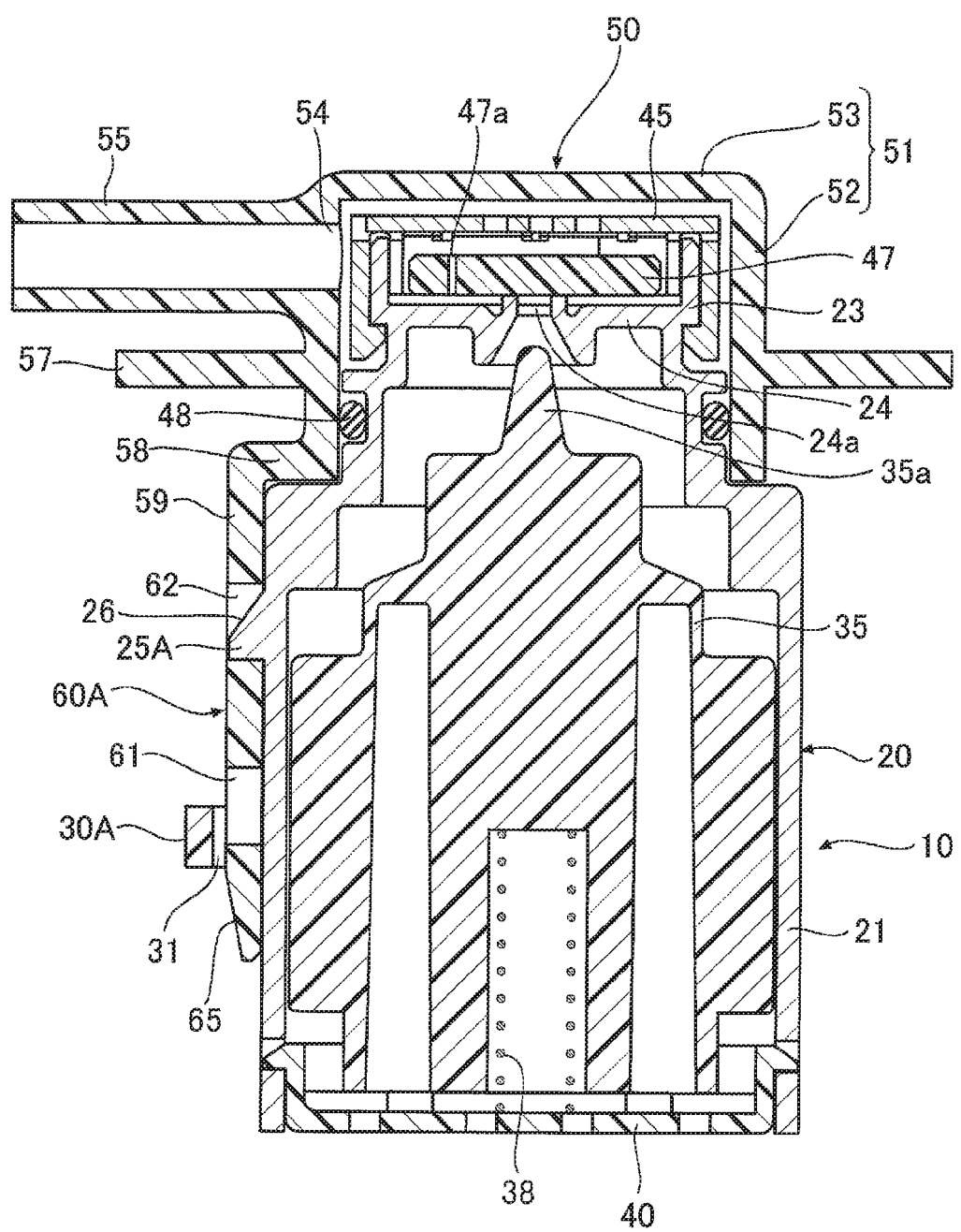
FIG. 3 is a cross-sectional view of a valve device including the structure where a float valve element descends.

As shown in FIGS. 1 and 3, the plate valve element 47 including a plurality of through-holes 47a is housed in a vertically movable manner inside the inner periphery of the upper cylinder portion 23 above the partition wall 24. The upper cap 45 is mounted on the upper opening portion of the upper cylinder portion 23, whereby the plate valve element 47 is retained.

The plate valve element 47 is arranged to, when the internal pressure of the fuel tank is lowered in the state where the opening 24a is closed by the float valve element 35, make the air outside the fuel tank flow into the fuel tank, and to, when the internal pressure inside the fuel tank increases, ascend to open the opening 24a, whereby fuel vapors are discharged out of the fuel tank.

The plate valve element 47 and the float valve element 35 define the "valve element" of the present invention.

The valve case 10 includes an engagement convex portion arranged to, when the upper cylinder portion 23 is inserted into to be supported by the valve case supporting portion 51 of the mounting base 50, be inserted sequentially into first engagement holes 61 and second engagement holes 62 provided to the retaining pieces 60A, 60B, and 60C (see FIGS. 1 and 3).

Figure 2:
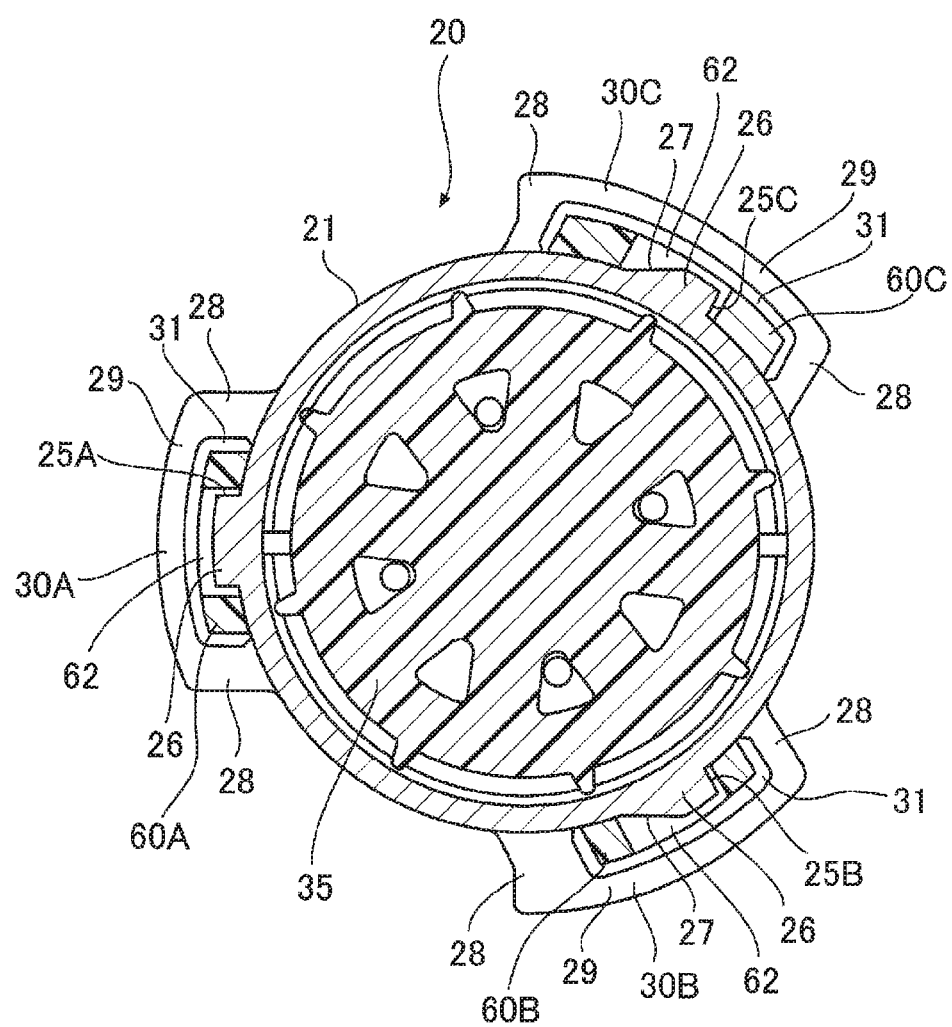
FIG. 2 is a cross-sectional view of the structure taken along the arrow line A-A of FIG. 6.

In the present embodiment, a plurality of engagement convex portions 25A, 25B, and 25C protrude at regular intervals in the circumferential direction from the positions slightly lower than the communication holes 21 on the outer periphery of the upper portion on the peripheral wall 21 of the case main body 20 as shown in FIGS. 1 and 2.

A tapered surface 26 gradually reduced in height along the direction of inserting the upper cylinder portion 23 into the valve case supporting portion 51 is provided on an upper surface side of each of the engagement convex portions 25A, 25B, and 25C. The retaining pieces 60A, 60B, and 60C are made easy to expand by the tapered surfaces 26 when the distal ends of the retaining pieces 60A, 60B, and 60C abut on the engagement convex portions 25A, 25B, and 25C to expand. When the case main body 20 is seen in a plan view as shown in FIG. 2, a tapered surface 27 gradually reduced in height toward the engagement convex portion 25A is provided on one lateral side of each of the engagement convex portions 25B and 25C, the one lateral side facing the engagement convex portion 25A.

The valve case 10 includes holding portions including holding spaces 31 arranged to receive to regulate the expansion of the distal ends of the retaining piece 60A, 60B, and 60C of the mounting base 50.

In the present embodiment, a plurality of holding portions 30A, 30B, and 30C are provided at regular intervals in the circumferential direction at almost intermediate positions of the peripheral wall 21 of the case main body 20 at positions matched with the plurality of engagement convex portions 25A, 25B, and 25C as shown in FIGS. 1 and 2. Each of the holding portions 30A, 30B, and 30C includes both sidewalls 28 and 28 apart a predetermined distance from each other and protruding from the outer periphery of the peripheral wall 21, and a connecting wall 29 connecting the both sidewalls 28 and 28, and thus is opened in the vertical direction and has a frame-like approximately square U shape when the valve case is seen in a plan view, and the holding space 31 is provided therein as shown in FIG. 2. The engagement convex portions 25A, 25B, and 25C are disposed to be matched with the holding spaces 31 of the holding portions 30A, 30B, and 30C when the case main body 20 is seen in a plan view as shown in FIG. 2.

The holding portion 30C disposed to be matched with the engagement convex portion 25C is larger in width in the circumferential direction of the peripheral wall 21 than the other holding portions 30A and 30B as shown in FIG. 2. The distal end portion of the retaining piece 60C that is larger in width, which is to be described later, is inserted into the holding portion 30C. The one sidewall 28 of the holding portion 30B corresponding to the retaining piece 60B, the one sidewall 28 disposed on the holding portion 30A side, is thicker that the other sidewall 28 as shown in FIG. 2.

While each holding portion according to the present embodiment has a frame-like approximately square U shape, each holding portion may have, but not particularly limited to, a circular arc frame shape or a cantilever-like approximately L shape when the valve case is seen in a plan view only if each holding portion includes a holding space arranged to receive to regulate the expansion of the distal end of the retaining piece.

Next, the mounting base 50 will be described.

As shown in FIGS. 1 and 3, the mounting base 50 according to the present embodiment includes the valve case supporting portion 51 having an approximately circular cylindrical shape with its upper portion closed while its lower portion opened that includes a peripheral wall 52 having a circular cylindrical shape, and a ceiling wall 53 closing the upper portion of the peripheral wall 52. In the present embodiment, the upper cylinder portion 23 of the valve case 10 is inserted into to be supported by the valve case supporting portion 51.

A communicating opening 54 is provided at a predetermined position on the peripheral wall 52 of the valve case supporting portion 51, and a connecting tube 55 extends from the outer circumferential edge of the communicating opening 54. The connecting tube 55 is connected with, for example, a tube connected with a check valve, a cut valve, or the like (not illustrated), or a tube connected with a canister (not illustrated) that is disposed outside the fuel tank.

A flange portion 57 having an annular shape protrudes in the radial outer direction from the outer periphery closer to the opening portion in a lower portion of the peripheral wall 52. The flange portion 57 is welded to the top side circumferential edge of an opening portion of the fuel tank (not illustrated), whereby the mounting base 50 is fixed to the fuel tank. The mounting base may be fixed indirectly to the fuel tank via a bracket or the like, and the fixing structure of the mounting base is not particularly limited.

Retaining pieces arranged to retain the valve case 10 extend downward from the peripheral portion of the valve case supporting portion 51.

In the present embodiment, a plurality of retaining pieces 60A, 60B, and 60C extend downward at regular intervals in the circumferential direction from the outer periphery of the opening portion in the lower portion of the peripheral wall 52 that constitutes the valve case supporting portion 51 as shown in FIGS. 1 and 3.

Each of the retaining pieces 60A, 60B, and 60C has the shape of the inverted letter L and including a base portion 58 protruding in the radial outer direction from the outer periphery of the peripheral wall 52, and a plate portion 59 bendable and suspended downward from the end portion of the base portion 58 as shown in FIG. 3. The distal end portions of the retaining pieces 60A, 60B, and 60C are inserted into the holding spaces 31 of the holding portions 30A, 30B, and 30C (see FIG. 2).

Each of the retaining pieces 60A, 60B, and 60C includes a quadrangular first engagement hole 61 disposed on its distal end side, and a quadrangular second engagement hole 62 disposed closer to its base end side than the first engagement hole 61, the first engagement hole 61 and the second engagement hole 62 being separated from each other by a predetermined distance (see FIG. 1). The engagement convex portions 25A, 25B, and 25C of the valve case 10 are inserted into to be engaged with the first engagement holes 61 and the second engagement holes 62 of the retaining pieces 60A, 60B, and 60C.

The retaining pieces may have, but not particularly limited to, the shape such as a belt-like shape extending from the outer periphery of the lower portion of the peripheral wall 52. While the engagement holes according to the present embodiment penetrate in the thickness directions of the retaining pieces, the engagement holes may be concave portions formed from the insides of the retaining pieces so as to have a predetermined depth only if the engagement convex portions can be inserted therein. That is, the "engagement hole" of the present invention includes a concave portion.

The retaining piece 60C is larger in width than the other retaining pieces 60A and 60B, and is inserted into the holding space 31 of the holding portion 30C, whereby the valve case 10 can be prevented from being mounted wrongly in the circumferential direction of the mounting base 50.

Figure 7:
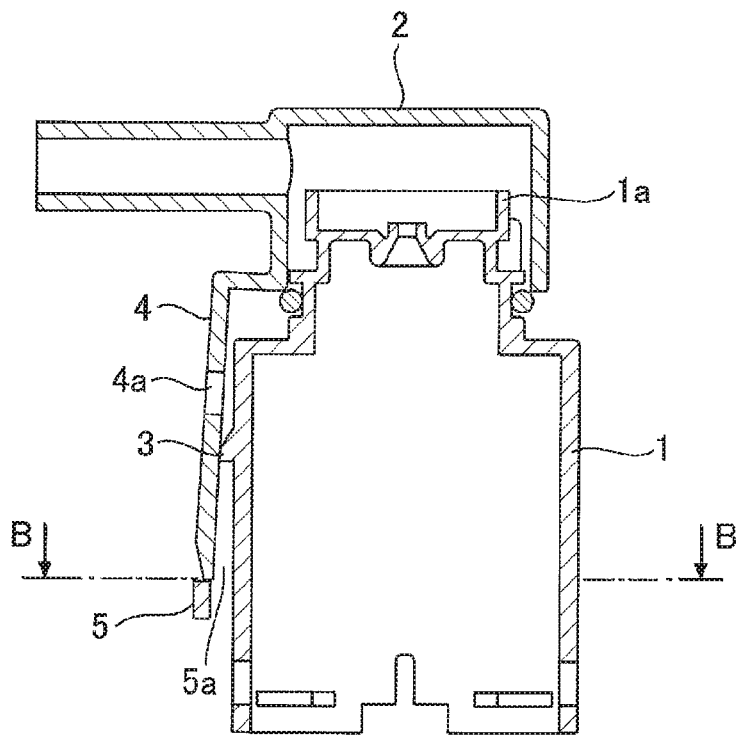
FIG. 7 is a cross-sectional explanatory view of a valve case mounting structure that is different from the valve case mounting structure according to the present invention.

A mounting structure including a valve case 1 and a mounting base 2 is shown in FIG. 7, that is different from the valve case mounting structure according to the present invention. To be specific, in the structure, the mounting base 2 includes retaining pieces 4, each of which includes only one engagement hole 4a. In this case, when an upper portion 1a of the valve case 1 is inserted to be pushed into a case supporting portion 2a of the mounting base 2 in order to insert to make engagement convex portions 3 engaged with the engagement holes 4a of the retaining pieces 4, the engagement convex portions 3 move inside the retaining pieces 4 to press to expand the retaining pieces 4 from the inside, so that the distal end portions of the retaining pieces 4 bump into holding portions 5 and is thus made unable to be pushed into holding spaces 5a as shown in FIG. 7. Thus, the retaining pieces 4 need to be inserted into the holding spaces 5a by being pushed by a hand.

Figure 4A:
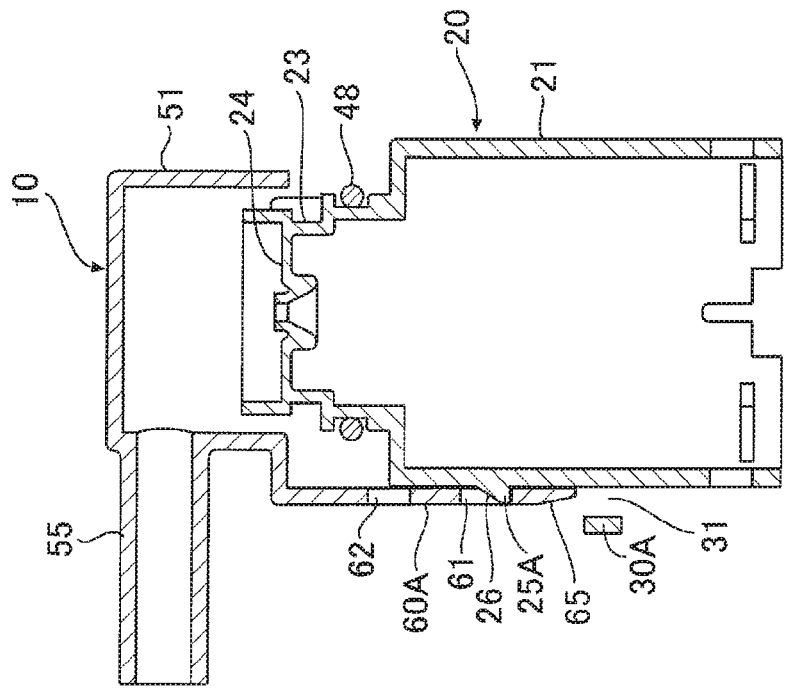
FIGS. 4A and 4B are views of the structure showing the state where the valve case is mounted on the mounting base.
Figure 4B:
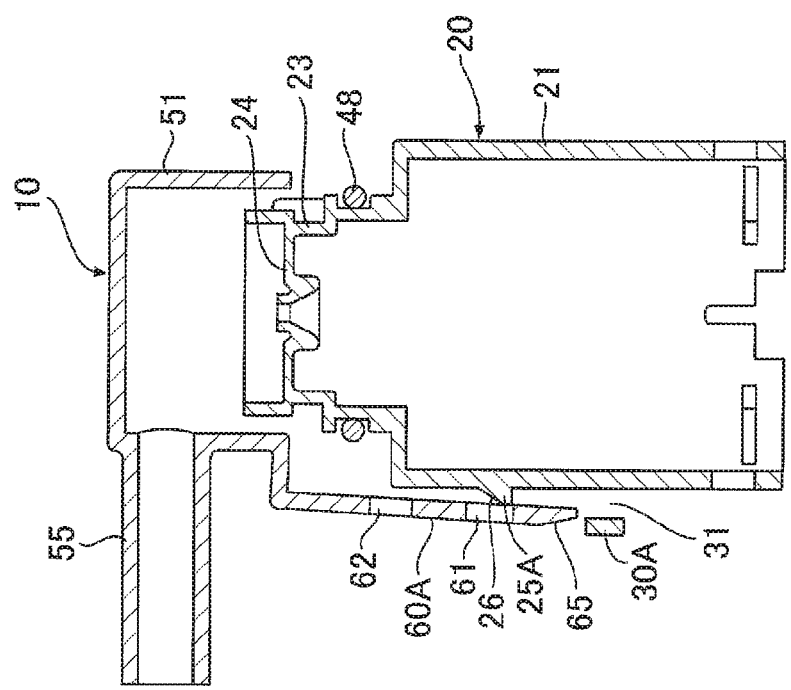

Meanwhile, as shown in FIG. 4B, in the valve case mounting structure according to the present invention, the retaining pieces 60A, 60B, and 60C are arranged to, when the engagement convex portions 25A, 25B, and 25C are positioned on the distal end sides of the first engagement holes 61 (the distal end sides in the extending directions of the retaining pieces, the same shall apply hereinafter), be out of reach of the holding portions 30A, 30B, and 30C (see FIG. 4B). Rather, the distal end portions of the retaining pieces 60A, 60B, and 60C are arranged to, before the retaining pieces 60A, 60B, and 60C expanded by being pressed from the inside by the engagement convex portions 25A, 25B, and 25C to become uninsertable into the holding spaces 31 of the holding portions 30A, 30B, and 30C when the engagement convex portions 25A, 25B, and 25C move from the distal end sides of the first engagement holes 61 to the second engagement holes 62, be inserted into the holding spaces 31 (see FIG. 5B).

Figure 8:
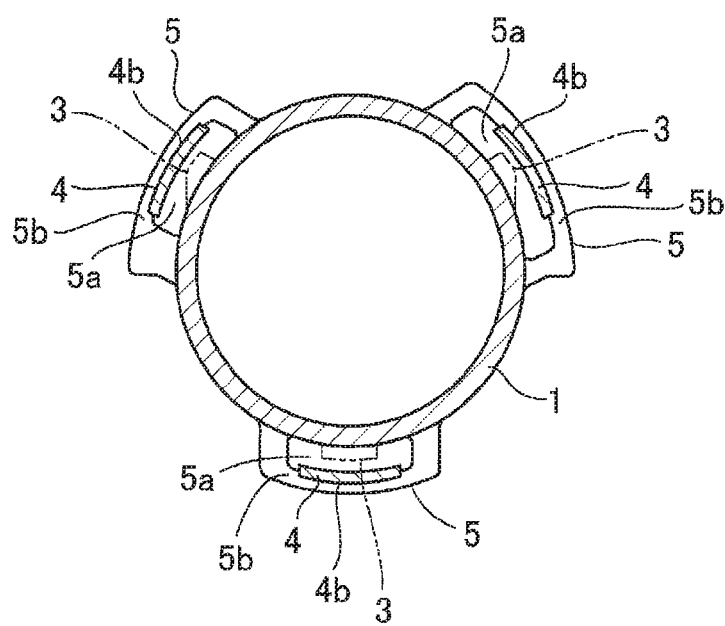
FIG. 8 is a cross-sectional view of the structure taken along the arrow line B-B of FIG. 7.

In the present invention, the state where the retaining pieces become "uninsertable" into the holding spaces of the holding portions means a state where edge portions 4b on the outer sides of the distal ends of the retaining pieces 4 overlap (wrap) upper ends 5b of the circumferential edges of the holding spaces of the holding portions 5 when the valve case 1 is seen in the axial direction in a plan view as shown in FIG. 8.

The distal end portions of the retaining pieces 60A, 60B, and 60C are arranged to, when the engagement convex portions 25A, 25B, and 25C are positioned on the base end sides of the first engagement holes 61 (the base end sides in the extending directions of the retaining pieces, the same shall apply hereinafter) as shown in FIG. 5A when the engagement convex portions 25A, 25B, and 25C move from the distal end sides of the first engagement holes 61 to the second engagement holes 62 as described above, be inserted into the holding spaces 31 of the holding portions 30A, 30B, and 30C.

The first engagement holes 61 are arranged to, when the engagement convex portions 25A, 25B, and 25C are inserted into to be engaged with the second engagement holes 62 and the upper cylinder portion 23 of the valve case 10 is inserted into to be supported by the valve case supporting portion 51, be positioned inside the holding spaces 31 of the holding portions 30A, 30B, and 30C as shown in FIG. 3.

Each of the retaining pieces 60A, 60B, and 60C includes a tapered surface 65 on the outer side of its distal end portion, the tapered surfaces 65 being gradually thinner toward the retaining pieces' distal ends. The tapered surfaces 65 are arranged to, when the engagement convex portions 25A, 25B, and 25C abut on to pass by the inner surfaces of the wall portions between the first engagement holes 61 and the second engagement holes 62 of the retaining pieces 60A, 60B, and 60C, abut on the opening circumferential edges of the holding spaces 31 of the holding portions 30A, 30B, and 30C as shown in FIG. 5B.

While three pieces of the holding portions are provided to the valve case and three pieces of the retaining pieces are provided to the mounting base in the present embodiment, one, two, or three or more pieces may be provided.

While the valve case supporting portion 51 has a cylindrical shape, and the upper cylinder portion 23 of the valve case 10 is inserted into the valve case supporting portion 51 in the present embodiment, a valve case supporting portion is not particularly limited thereto only if it has the structure of being capable of supporting the upper portion of the valve case. While the plurality of retaining pieces 60A, 60B, and 60C are disposed on the outer periphery of the axial center of the valve case supporting portion 51, and the valve case supporting portion 51 is disposed at a position close to the retaining pieces 60A, 60B, and 60C in the present embodiment, the valve case supporting portion may be disposed at, but not particularly limited to, a position apart from the retaining pieces.

While the valve device including the mounting base 50 and the valve case 10 that is mounted on the mounting base 50 includes the float valve element 35 and functions as a so-called cutoff valve arranged to close the opening when the fuel level inside the fuel tank abnormally rises in the present embodiment, the valve case mounting structure according to the present invention can be applied to, but not particularly limited to, valve case mounting structures for mounting a valve case including a check valve or other valve elements.

Next, the operation and advantageous effect of the valve case mounting structure having the above-described configuration according to the present invention will be described referring to FIGS. 3 to 6. While FIGS. 3 to 6 are views where the retaining piece 60A is inserted into the holding space 31 of the holding portion 30A on the grounds of the sectional position, the retaining pieces 60B and 60C are also inserted into the holding spaces 31 of the holding portions 30B and 30C.

First, the retaining pieces 60A, 60B, and 60C of the mounting base 50 are aligned to be matched with the engagement convex portions 25A, 25B, and 25C and the holding portions 30A, 30B, and 30C of the valve case 10, respectively.

The retaining piece 60C is larger in width than the other retaining pieces 60A and 60B, and can be inserted only into the holding space 31 of the holding portion 30C. Thus, the valve case 10 can be prevented from being mounted wrongly in the circumferential direction of the mounting base 50, whereby the mounting angle of the connecting tube 55 of the mounting base 50 can be regulated.

The valve case 10 is pushed in to the mounting base 50 in this state, and the upper cylinder portion 23 of the valve case 10 is inserted into the valve case supporting portion 51 having a circular cylindrical shape.

Then, the distal ends of the retaining pieces 60A, 60B, and 60C abut on the tapered surfaces 26 of the engagement convex portions 25A, 25B, and 25C, and the retaining pieces 60A, 60B, and 60C are pressed from the inside while being guided by the tapered surfaces 26 to be bent and deformed to expand outward while the engagement convex portions 25A, 25B, and 25C move on the inner sides of the wall portions of the retaining pieces 60A, 60B, and 60C (see FIG. 4A).

Then, when the engagement convex portions 25A, 25B, and 25C get in the first engagement holes 61, the retaining pieces 60A, 60B, and 60C flexibly return, whereby the engagement convex portions 25A, 25B, and 25C get engaged with the first engagement holes 61 (see FIG. 4B).

The engagement convex portions 25A, 25B, and 25C are positioned on the distal end sides of the first engagement holes 61, and in this state, the distal end portions of the retaining pieces 60A, 60B, and 60C are flexibly return inward, without reaching the holding portions 30A, 30B, and 30C. Thus, the distal end portions get close to the peripheral wall 21 of the case main body 20 as shown in FIG. 4B.

Then, when the valve case 10 is pushed in, and the upper cylinder portion 23 of the valve case 10 is inserted deep into the valve case supporting portion 51, the engagement convex portions 25A, 25B, and 25C move from the distal end sides to the base end sides of the first engagement holes 61, and the tapered surfaces 26 of the engagement convex portions 25A, 25B, and 25C abut on the inner circumferential edges on the base end sides of the first engagement holes 61 while the distal ends of the retaining pieces 60A, 60B, and 60C are inserted into the holding spaces 31 of the holding portions 30A, 30B, and 30C (see FIG. 5A). Thus, the retaining pieces 60A, 60B, and 60C can be inserted into the holding spaces 31 of the holding portions 30A, 30B, and 30C with no need of being pushed by a hand.

When the valve case 10 is further pushed in, the engagement convex portions 25A, 25B, and 25C get out of the first engagement holes 61 to abut on the inner surfaces of the wall portions between the first engagement holes 61 and the second engagement holes 62 of the retaining pieces 60A, 60B, and 60C. Meanwhile, the tapered surfaces 65 of the retaining pieces 60A, 60B, and 60C abut on the opening circumferential edges of the holding spaces 31 of the holding portions 30A, 30B, and 30C, so that the engagement convex portions 25A, 25B, and 25C move relatively with pushing and expanding the retaining pieces 60A, 60B, and 60C outward so as to be bent like a bow (see FIG. 5B).

Then, when the engagement convex portions 25A, 25B, and 25C get in the second engagement holes 62, the retaining pieces 60A, 60B, and 60C flexibly return, whereby the engagement convex portions 25A, 25B, and 25C are engaged with the second engagement holes 62 (see FIG. 3).

The distal end portions of the retaining pieces 60A, 60B, and 60C are arranged to, before the retaining pieces 60A, 60B, and 60C is expanded by being pressed from the inside by the engagement convex portions 25A, 25B, and 25C to become uninsertable into the holding spaces 31 of the holding portions 30A, 30B, and 30C, be inserted into the holding spaces 31. Thus, the retaining pieces 60A, 60B, and 60C are inserted into to be held by the holding spaces 31 of the holding portions 30A, 30B, and 30C when the engagement convex portions 25A, 25B, and 25C get in the second engagement holes 62.

As a result, while the engagement convex portions 25A, 25B, and 25C get engaged with to be retained by the second engagement holes 62 of the retaining pieces 60A, 60B, and 60C, the distal end portions of the retaining pieces 60A, 60B, and 60C are held by the holding spaces 31 of the holding portions 30A, 30B, and 30C, and the expansion of the retaining pieces 60A, 60B, and 60C is regulated. Thus, the valve case 10 can be securely mounted on the mounting base 50 without the risk of being dropped off.

In addition, the engagement convex portions 25A, 25B, and 25C can be engaged with the second engagement holes 62 of the retaining pieces 60A, 60B, and 60C. Thus, while the distal end portions of the retaining pieces 60A, 60B, and 60C can be inserted into the holding spaces 31 of the holding portions 30A, 30B, and 30C only by the simple operation of matching the retaining pieces 60A, 60B, and 60C with the engagement convex portions 25A, 25B, and 25C and the holding portions 30A, 30B, and 30C of the valve case 10 respectively and pushing in the valve case 10 toward the valve case supporting portion 51 of the mounting base 50. And, mounting workability of the valve case 10 on the mounting base 50 can be improved while insertion resistance of the valve case 10 can be reduced, which allows the valve case 10 to be smoothly mounted on the mounting base 50.

In the present embodiment, the distal end portions of the retaining pieces 60A, 60B, and 60C are arranged to, when the engagement convex portions 25A, 25B, and 25C are positioned on the base end sides of the first engagement holes, be inserted into the holding spaces 31 of the holding portions 30A, 30B, and 30C as shown in FIG. 5A.

Thus, the distal end portions of the retaining pieces 60A, 60B, and 60C are inserted into the holding spaces 31 of the holding portions 30A, 30B, and 30C before the engagement convex portions 25A, 25B, and 25C get out of the first engagement holes 61 to press again the retaining pieces 60A, 60B, and 60C from the inside to expand, which allows the distal end portions of the retaining pieces 60A, 60B, and 60C to be more smoothly inserted into the holding spaces 31 of the holding portions 30A, 30B, and 30C.

In the present embodiment, the first engagement holes 61 are arranged to, when the engagement convex portions 25A, 25B, and 25C are inserted into to be engaged with the second engagement holes 62 and the upper cylinder portion 23 of the valve case 10 is inserted into to be supported by the valve case supporting portion 51, be positioned inside the holding spaces 31 of the holding portions 30A, 30B, and 30C as shown in FIG. 3.

Thus, when the mounting base 50 is swollen with fuel in a case where the mounting base 50 is made from a material that is more likely to be swollen with fuel than the material from which the valve case 10 is made, for example, in a case where the valve case 10 is made from polyoxymethylene (POM) that is less likely to be swollen with fuel while the mounting base 50 is made from polyethylene (PE) that is more likely to be swollen with fuel than polyoxymethylene. Thus, pressure from the retaining pieces 60A, 60B, and 60C is less likely to act on the holding portions 30A, 30B, and 30C of the valve case 10 even if the retaining pieces 60A, 60B, and 60C are swollen with fuel, because the first engagement holes 61, which have a small cross sectional area, of the retaining pieces 60A, 60B, and 60C of the mounting base 50 are positioned inside the holding spaces 31 of the holding portions 30A, 30B, and 30C. Thus, the holding portions 30A, 30B, and 30C can be prevented from being easily broken.

In the present embodiment, the tapered surfaces 65 provided on the outer sides of its distal end portions of the retaining pieces 60A, 60B, and 60C are arranged to, when the engagement convex portions 25A, 25B, and 25C abut on to pass by the inner surfaces of the wall portions between the first engagement holes 61 and the second engagement holes 62 of the retaining pieces 60A, 60B, and 60C, abut on the opening circumferential edges of the holding spaces 31 of the holding portions 30A, 30B, and 30C as shown in FIG. 5B.

Thus, even if the distal end portions of the retaining pieces 60A, 60B, and 60C are held and regulated not to expand by the holding spaces 31 of the holding portions 30A, 30B, and 30C, the tapered surfaces 65 can achieve mild change in bending amounts of the retaining pieces 60A, 60B, and 60C to reduce the insertion resistance as much as possible, and can also guide to smoothly insert the retaining pieces 60A, 60B, and 60C into the holding spaces 31 of the holding portions 30A, 30B, and 30C.

Figure 6:
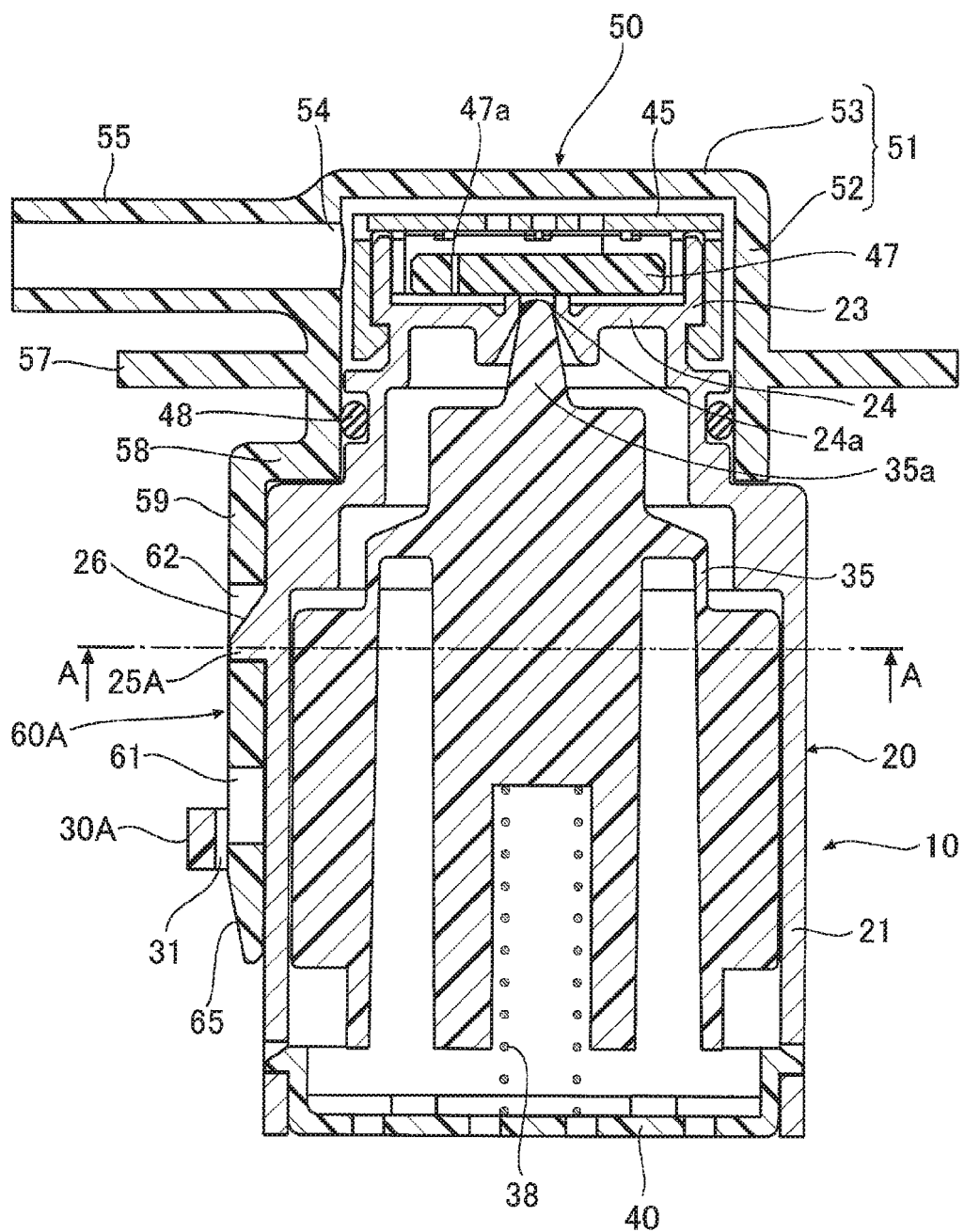
FIG. 6 is a cross-sectional view of the valve device having the structure where a float valve element ascends.

As described above, in the valve device including the mounting base 50 and the valve case 10 that is mounted on the mounting base 50, when the fuel level inside the fuel tank rises when the vehicle sharply turns or is inclined, and the fuel flows into the interior space of the case main body 20, the float valve element 35 floats by the buoyant forces of the valve urging spring 38 and the float valve element 35 itself, whereby the opening 24a of the partition wall 24 is closed by the valve head 35a as shown in FIG. 6. Thus, the fuel can be stopped flowing into the interior space of the valve case supporting portion 51 through the opening 24a, and can be prevented from leaking out of the fuel tank through the communicating opening 54.

DESCRIPTION OF REFERENCE NUMERALS AND SIGNS

10 Valve case
20 Case main body
21 Peripheral wall
25A, 25B, 25C Engagement convex portion
30A, 30B, 30C Holding portion
31 Holding space
35 Float valve element
40 Lower cap
45 Upper cap
47 Plate valve element
50 Mounting base
51 Valve case supporting portion
60A, 60B, 60C Retaining piece
61 First engagement hole
62 Second engagement hole
65 Tapered surface

The invention claimed is:

1. A valve case mounting structure, the valve case mounting structure including:
a mounting base; and
a valve case mounted on the mounting base and accommodating a valve element thereinside,
wherein the mounting base includes
a valve case supporting portion arranged to support an upper portion of the valve case, and
a retaining piece extending downward front a peripheral portion of the valve case supporting portion and arranged to retain the valve case,
wherein the retaining piece includes
a first engagement hole disposed on its distal end side, and
a second engagement hole disposed closer to its base end side than the first engagement hole,
the first engagement hole and the second engagement hole being separated from each other by a predetermined distance,
wherein a peripheral wall of the valve case includes
an engagement convex portion arranged to be inserted sequentially into the first engagement hole and the second engagement hole in the course of causing the upper portion of the valve case to be supported by the valve case supporting portion, and
a holding portion including a holding space arranged to receive a distal end of the retaining piece to regulate an expansion thereof, and
wherein, when the engagement convex portion is positioned on a distal end side of the first engagement hole, the retaining piece does not reach the holding portion,
wherein, when the engagement convex portion is moved into position from the distal end side of the first engagement hole to the second engagement hole, the retaining piece is expanded by being pressed from an inside of the mounting base by the engagement convex portion, but the distal end of the retaining piece is inserted into the holding space of the holding portion before the retaining piece becomes uninsertable into the holding space of the holding portion, and
wherein the distal end side of the first engagement hole is positioned above the distal end of the retaining piece.

2. The valve case mounting structure of claim 1,
wherein the distal end of the retaining piece is inserted into the holding space of the holding portion when the engagement convex portion is positioned on a base end side of the first engagement hole.

3. The valve case mounting structure of claim 1,
wherein the first engagement hole is positioned inside the holding space of the holding portion when the engagement convex portion is inserted into the second engagement hole to be engaged therewith and the upper portion of the valve case is supported by the valve case supporting portion.

4. The valve case mounting structure of claim 1,
wherein the retaining piece includes a tapered surface on an outer side of the distal end of the retaining piece so as to become gradually thinner toward the distal end of the retaining piece, and
wherein the tapered surface abuts on an opening circumferential edge of the holding space of the holding portion when the engagement convex portion is abuttingly passing by a wall portion between the first engagement hole and the second engagement hole.

5. The valve case mounting structure of claim 1, wherein the holding space of the holding portion regulates an expansion movement of the retaining piece when the engagement convex portion moves from the distal end side of the first engagement hole to the second engagement hole.

6. The valve case mounting structure of claim 1, wherein the retaining piece contacts a surface defining the holding space when the engagement convex portion is in the first engagement hole.

7. The valve case mounting structure of claim 1, wherein the distal end of the retaining piece abut on a tapered surface of the engagement convex portion, and
wherein the retaining piece is pressed from an inside while being guided by the tapered surface of the engagement convex portion to be bent and deformed to expand outward while the engagement convex portion moves on an inner side of a wall portion of the retaining piece.

8. The valve case mounting structure of claim 1, wherein the distal end portion of the retaining piece is inserted into the holding space of the holding portion before the engagement convex portion gets out of the first engagement hole.

9. The valve case mounting structure of claim 1, wherein an outer side of the distal end portion of the retaining piece include a tapered surface that, when the engagement convex portion abuts on to pass by an inner surface of a wall portion between the first engagement hole and the second engagement hole of the retaining piece, abut on an opening circumferential edge of the holding space of the holding portion.

10. The valve case mounting structure of claim 1, wherein, when the engagement convex portion is moved into position from the distal end side of the first engagement hole toward the base end of the first engagement hole to get out of the first engagement hole to abut on the inner side of the retaining piece, and proceeds while expanding the retaining piece outward to get in the second engagement hole, the retaining piece is expanded by being pressed from the inside of the mounting base by the engagement convex portion, but the distal end of the retaining piece is inserted into the holding space of the holding portion before the retaining piece becomes uninsertable into the holding space of the holding portion, and
wherein the retaining piece is arranged to, when the engagement convex portion is inserted into to be engaged with the first engagement hole and the upper portion of the valve case is inserted into to be supported by the valve case supporting portion, be positioned inside the holding space of the holding portion.

* * * * *